(12) United States Patent
Nguyen et al.

(10) Patent No.: US 7,953,907 B1
(45) Date of Patent: May 31, 2011

(54) CONCURRENT INPUT/OUTPUT CONTROL AND INTEGRATED ERROR MANAGEMENT IN FIFO

(75) Inventors: Huy Tu Nguyen, Laguna Hills, CA (US); William C. Wong, Cerritos, CA (US); Kha Nguyen, Anaheim, CA (US)

(73) Assignee: Marvell International Ltd., Hamilton (BM)

( * ) Notice: Subject to any disclaimer, the term of this patent is extended or adjusted under 35 U.S.C. 154(b) by 629 days.

(21) Appl. No.: 11/840,059

(22) Filed: Aug. 16, 2007

Related U.S. Application Data (60) Provisional application No. 60/823,210, filed on Aug. 22, 2006.

(51) Int. Cl.
*G06F 3/00* (2006.01)
*G06F 11/00* (2006.01)

(52) U.S. Cl. ........... 710/52; 710/15; 710/16; 710/17; 710/18; 710/19; 710/21; 710/57; 714/48; 714/100; 714/769; 370/216; 370/242

(58) Field of Classification Search ............ 710/21, 710/15–19, 52, 57; 714/48, 100, 769; 370/216, 370/242
See application file for complete search history.

(56) References Cited

U.S. PATENT DOCUMENTS

| | | | |
|---|---|---|---|
| 3,800,281 A * | 3/1974 | Devore et al. | 714/755 |
| 3,930,146 A * | 12/1975 | Bogacz | 714/25 |
| 5,261,083 A * | 11/1993 | Witkowski et al. | 714/48 |
| 5,333,274 A * | 7/1994 | Amini et al. | 714/50 |
| 5,513,172 A * | 4/1996 | Shikama et al. | 370/428 |
| 5,563,896 A * | 10/1996 | Nakaguchi | 714/785 |
| 5,581,715 A * | 12/1996 | Verinsky et al. | 714/48 |
| 5,629,949 A * | 5/1997 | Zook | 714/769 |
| 5,691,994 A * | 11/1997 | Acosta et al. | 714/784 |
| 5,742,623 A * | 4/1998 | Nuber et al. | 714/798 |
| 5,758,057 A * | 5/1998 | Baba et al. | 714/7 |
| 5,760,792 A * | 6/1998 | Holt et al. | 345/558 |
| 5,764,930 A * | 6/1998 | Staats | 710/107 |
| 5,812,564 A * | 9/1998 | Bonke et al. | 714/769 |
| 5,978,954 A * | 11/1999 | Ou et al. | 714/769 |
| 6,092,231 A * | 7/2000 | Sze | 714/758 |
| 6,192,492 B1 * | 2/2001 | Masiewicz et al. | 714/56 |
| 6,195,770 B1 * | 2/2001 | Walton | 714/53 |
| 6,275,242 B1 * | 8/2001 | Shah et al. | 345/533 |
| 6,332,181 B1 * | 12/2001 | Bossen et al. | 711/155 |
| 6,536,000 B1 * | 3/2003 | Jackson et al. | 714/57 |
| 6,615,374 B1 * | 9/2003 | Moran | 714/48 |
| 6,622,260 B1 * | 9/2003 | Marisetty et al. | 714/10 |
| 6,625,773 B1 * | 9/2003 | Boivie et al. | 714/749 |

(Continued)

OTHER PUBLICATIONS

'Coordinated Checkpointing-Rollback Error Recovery for Distributed Shared Memory Multicomputers' by G Janakiraman and Yuval Tamir, Proceedings of the 13th Symposium on Reliable Distributed Systems, Oct. 1994.*

*Primary Examiner* — Henry W Tsai
*Assistant Examiner* — Steven G Snyder (57) ABSTRACT

A FIFO memory has integrated error management to react to different errors according to the current state of operation of the input and output as well as internal conditions such as buffer memory status. The FIFO memory completes or aborts current operations according to state and leaves the FIFO memory in known condition following error handling. Thus, data sent to a host avoids data gaps or data overlaps because the FIFO memory leaves operations in a known state before reporting the error to a controller.

33 Claims, 8 Drawing Sheets

U.S. PATENT DOCUMENTS

| | | | |
|---|---|---|---|
| 6,741,253 B2 * | 5/2004 | Radke et al. | 345/531 |
| 6,756,988 B1 * | 6/2004 | Wang et al. | 345/558 |
| 6,804,794 B1 * | 10/2004 | Robidoux et al. | 714/5 |
| 6,810,489 B1 * | 10/2004 | Zhang et al. | 714/6 |
| 6,868,517 B1 * | 3/2005 | Feng et al. | 714/758 |
| 6,950,978 B2 * | 9/2005 | Arndt et al. | 714/800 |
| 6,996,045 B1 * | 2/2006 | Sumi et al. | 369/53.3 |
| 7,325,117 B2 * | 1/2008 | Iwamitsu et al. | 711/167 |
| 2002/0085497 A1 * | 7/2002 | Phillips et al. | 370/235.1 |
| 2003/0112798 A1 * | 6/2003 | Ziegler et al. | 370/366 |
| 2006/0053331 A1 * | 3/2006 | Chou et al. | 714/2 |
| 2006/0098001 A1 * | 5/2006 | Lai | 345/204 |
| 2007/0050689 A1 * | 3/2007 | Sasakura | 714/718 |
| 2009/0198694 A1 * | 8/2009 | Thomas | 707/8 |

* cited by examiner

CONCURRENT INPUT/OUTPUT CONTROL AND INTEGRATED ERROR MANAGEMENT IN FIFO

RELATED APPLICATION

This application claims priority to U.S. Provisional Application 60/823,210, entitled "COMMUNICATION BETWEEN TWO SIDES OF A FIFO," filed Aug. 22, 2006, which is hereby incorporated by reference herein in its entirety.

BACKGROUND

A FIFO is a specialized dual port memory with an input and an output that operate asynchronously. That is, data can be input at one end of the FIFO at one pace and read from the other end at a different pace. A FIFO is often used when data is received in blocks at one data rate and processed at a steadier, slower rate. One such application is a disk drive interface.

The shift register in a FIFO and its supporting control circuitry may all experience failures, separately or in combination. When a failure or an intentional abort occurs, the FIFO may be left in an unknown state, that is, having an uncertain condition of the data being read, data in the transmit register, and data being sent to a host. This may result in duplication of data when data thought to have been lost is incorrectly re-sent. Such errors may also result in gaps when data thought to have been sent was actually lost.

SUMMARY

A FIFO with integral error management determines the type of error and the state of input and output activity to determine next steps in FIFO error recovery. The error recovery process ensures that error-free processes continue to completion before action is initiated to reset the FIFO and restart operation. A state machine, implemented in a variety of technologies, may be used to manage the error recovery process by determining activities that should be continued or aborted responsive to a particular error. In this way, the FIFO may manage part of the error recovery process before a controller is even notified of the failure.

By processing errors to a known conclusion, the controller working in conjunction with the FIFO can be certain of the state of data and recover without duplication or gaps in data transmission.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the teen '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim teen by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
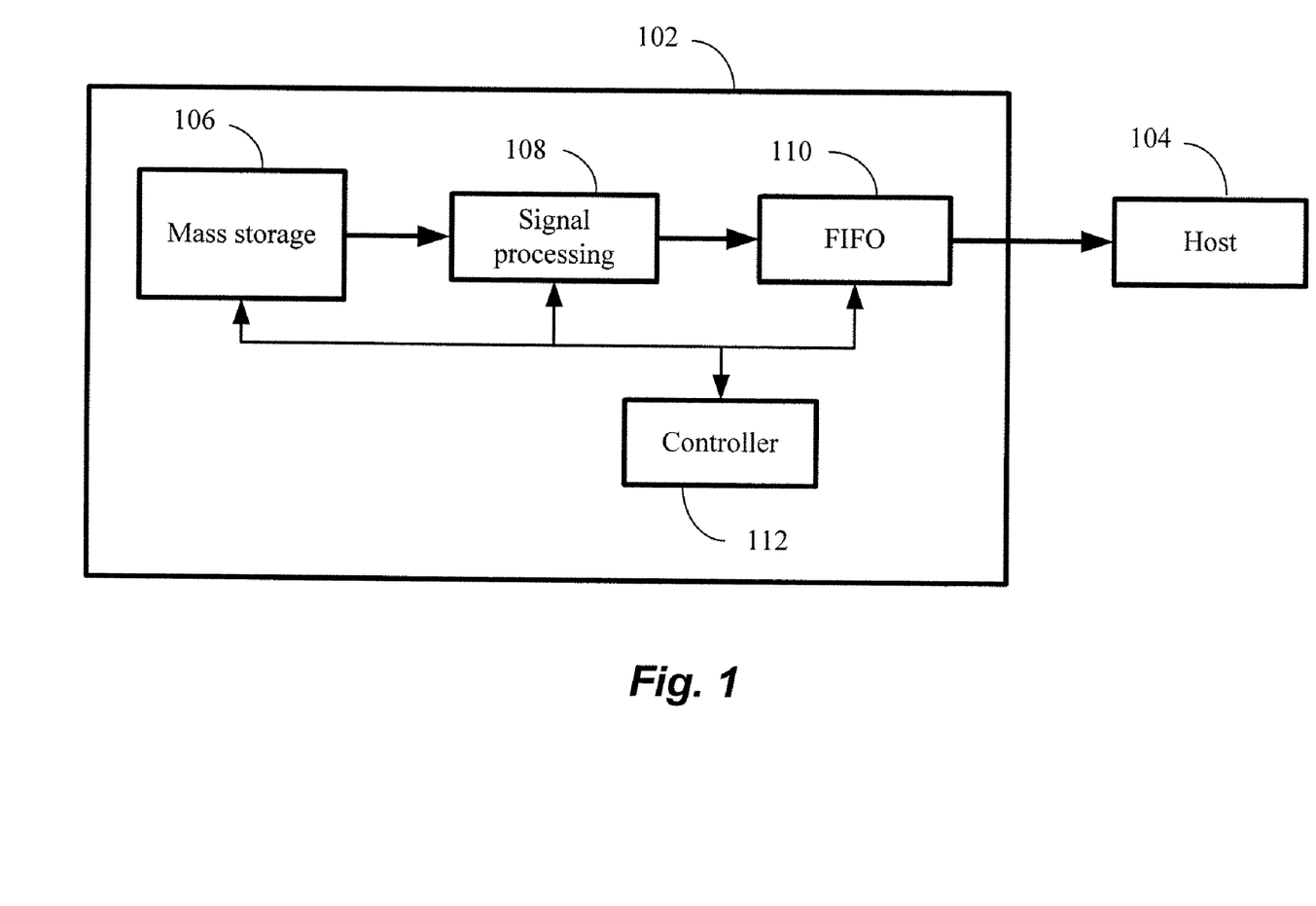
FIG. 1 is a simplified and representative block diagram of a disk drive coupled to a host.

FIG. 1, a simplified and representative block diagram of a disk drive 102 coupled to a host 104 is discussed and described. The disk drive 102 may be used for storing relatively large amounts of non-volatile data, meaning the data persists when power is removed from the drive. The disk drive may have fixed or removable media, for example, non-removable ceramic or metallic disks, or may have removable media, such as optical disks like CDs, DVDs, Blu-ray or others. Older and less common removable media include floppy disks of various kinds. While not technically a disk, i.e. rotating media, many kinds of solid state memory may also require buffering of the kind described below and associated with rotating media. The disk drive 102 may be connected to the host 104 by a peripheral bus, such as a serial Advanced Technology Attachment (SATA), Integrated Drive Electronics (IDE/PATA) bus, USB, IEEE 1394 (FireWire), small computer system interface (SCSI)/Ultra Wide SCSI, all known in the art or other wired or wireless communication links. The host 104 may be a computer, mobile computing devices such as personal digital assistants, cellular phones, media or MP3 players, televisions, set-top boxes, automotive dash board electronics, and the like.

A common characteristic of rotating media memory and some solid state memory is that the rate at which data arrives may not be compatible with the rate at which data is taken. For example, data read from rotating media may arrive in bursty chunks with pauses in between caused by head relocation. On the other side, data being transferred to a host may be optimally sent in a high-speed continuous stream.

The common solution to this kind of mismatch is a first-in first-out (FIFO) memory. Data on the input side is accepted and buffered at one rate and is streamed to the output continuously in the order it is received, that is, the first data received is the first data sent.

In the simplified version of the disk drive 102 of FIG. 1, showing data read components, the mass storage 106 may be rotating media or relatively slow solid state media. Data from the mass storage 106 may be processed by a signal processing unit 108, particularly when the signal from the mass storage 106 is an analog signal. The signal processing unit 108 may amplify the analog signal, adjust for DC offset and convert the analog signal to a digital output.

The digital output may be presented to a FIFO 110. The FIFO 110 allows data arriving at one rate from the signal processing unit 108 to be buffered and sent to the host 104 at a different rate. An exemplary FIFO in accordance with the current disclosure is discussed in more detail with regard to FIG. 2.

A controller 112 may manage operation of the disk drive 102. The controller 112 may manage head movement, synchronize clock rates, manage control signaling with the host 104 and manage error recovery when a failure occurs in the signal processing unit 108 or FIFO 110, among other tasks.

In operation, the disk drive 102 may receive a request for data at a certain disk location. The controller 112 may translate the disk location to a head location or track number. When signals begin to stream from the mass storage 106, the signal processing unit 108 may translate analog signals to digital data. The digital data may be stored in the FIFO 110, formatted according to a protocol associated with the data interface, and sent to the host 104.

Figure 2:
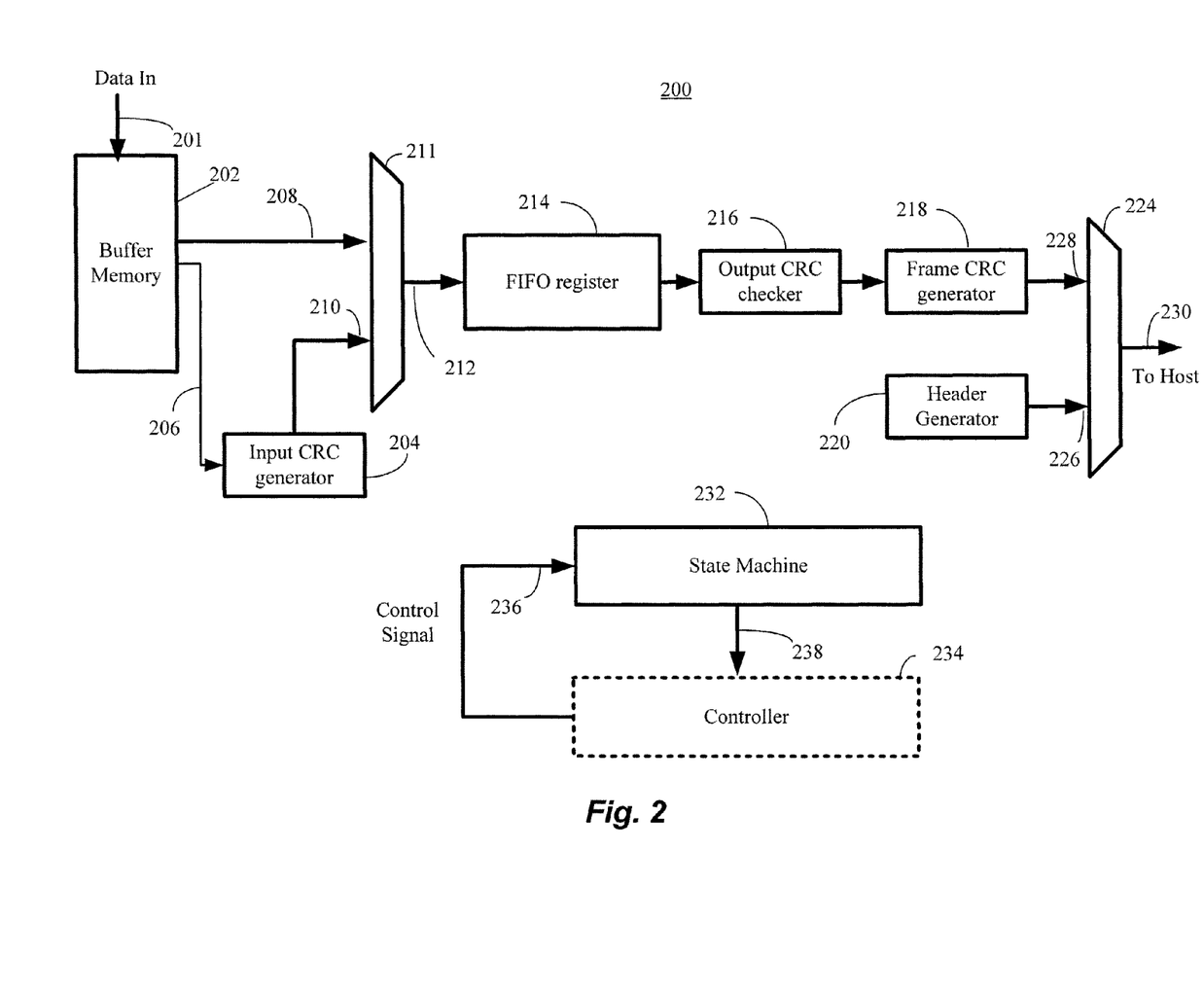
FIG. 2 is a simplified and representative block diagram of FIFO memory portion of a disk drive.

FIG. 2 is a simplified and exemplary block diagram of a FIFO 200, such as the FIFO 110 of FIG. 1. While the embodiment of the FIFO 110 of FIG. 1 is a disk drive, the FIFO 200 may be used in a multitude of applications including parallel to serial data converters or any application transferring data between devices that operate at different speeds or data rates.

A data input 201 may load data into a buffer memory 202. A cyclic redundancy check (CRC) generator 204 may receive data over connection 206 while the same data is sent over connection 208 to multiplexer 211. The output 212 of the multiplexer 211 couples data to a FIFO register 214, or transmit buffer, used to hold transmit data. The FIFO register 214 may be a serial in—serial out shift register or may be a parallel in—serial out shift register, or another configuration known in the art. The FIFO register 214 is coupled to an output CRC checker 216 which may in turn be coupled to a frame CRC generator 218. In some embodiments, a single CRC engine may be used to check the payload CRC and generate the frame CRC value. The frame CRC generator 218 may be coupled to a first input 228 of the multiplexer 224. A header generator 220 may be coupled to a second input of the multiplexer 224. Frame data may be output through a host connection 230.

A state machine 232 may be used to manage operation of the components of the FIFO 200, including error state management. A controller 234 may serve the same function as the controller 112 of FIG. 1. In other embodiments, the state machine 232, or another embodiment performing the functions of the state machine 232, may be incorporated in the controller 234. For example, the state machine may be implemented in software, microcode, a programmable array, or the like.

In the configuration shown in FIG. 2, the controller 234 has a control signal 236 to the state machine 232 and an input 238 from the state machine 232. Not shown in FIG. 2, for the sake of simplicity, are control signal and clock connections with the controller 234 and the state machine 232. Obvious management functions such as data clocking signals, multiplexer (211 and 224) switching, and protocol management for the host connection 230, to name a few, have not been shown, but are assumed.

In operation, data may be transferred from a mass storage element, for example, mass storage 106 of FIG. 1, to the buffer memory 202. Data may be clocked in serially or byte-wise. While data is transferred from the buffer memory 202 to the mulitplexer 211, the input CRC generator 204 may be calculating a CRC result to attach to the data payload being clocked into the FIFO register 214. After the payload is complete, the mulitplexer 211 may be switched from input 208 to input 210 to allow addition of the CRC to the data payload. The data path 206 may be used to feed data to the input CRC generator 204 or all input data may be routed through the input CRC generator 204.

When the FIFO register 214 is full, that is, has a frame of data including data payload and CRC, data may begin clocking out data. First the CRC calculated at the input CRC generator 204 may be checked at the output CRC checker 216. If there is no error, a frame CRC may be generated over the entire frame. After setting up a host communication session, a header may be generated and sent over host connection 230 by selecting the input 226 of the mulitplexer 224. After the header is sent, the data frame may be sent by selecting input 228 of the mulitplexer 224. After receipt of the data frame, a confirmation may be returned. When successfully received at the host 104, the confirmation may be an acknowledgement (ACK) message. If the frame is not received in good order the confirmation may be a no acknowledgement (NACK) message. Host connection and transmission errors are discussed in more detail below. After an ACK message, the FIFO 200 may notify the controller 234 that the send process has completed normally. In other embodiments the host protocol management may be managed by the controller 234.

As discussed above, errors may occur at virtually any point in the process. For example, the buffer memory 202 may receive incomplete data or inaccurate data, e.g. data may be presented with a CRC or parity error detected in the buffer memory 202. The input CRC generator 204 may receive incomplete data or may not match a buffer memory parity bit (if a 9-bit buffer memory is used, for example). A mulitplexer 211 error or clocking error may prevent the FIFO register 214 from receiving complete data, leaving a register bit (not depicted) in an unknown state. The output CRC checker 216 may discover an error, such as one caused by the previous condition. The frame CRC generator 218 may receive incomplete data and generate an error.

Errors between the disk drive 102 and the host 104 may include an inability to establish a connection over the host connection 230. After establishing a connection, a no-acknowledge (NACK) received from the host may indicate data was not received in good order. Another host error may occur when a number of frames of data are sent before an acknowledgement is received for any of the frames sent. When no confirmation (either ACK or NACK) is received during an acknowledgement interval or if the number of unacknowledged frames exceeds a limit, an error may be generated, a so-called ACK-NACK timeout error. The state machine 232 may monitor all possible sources of errors or may monitor only key input and output points.

Figure 3:
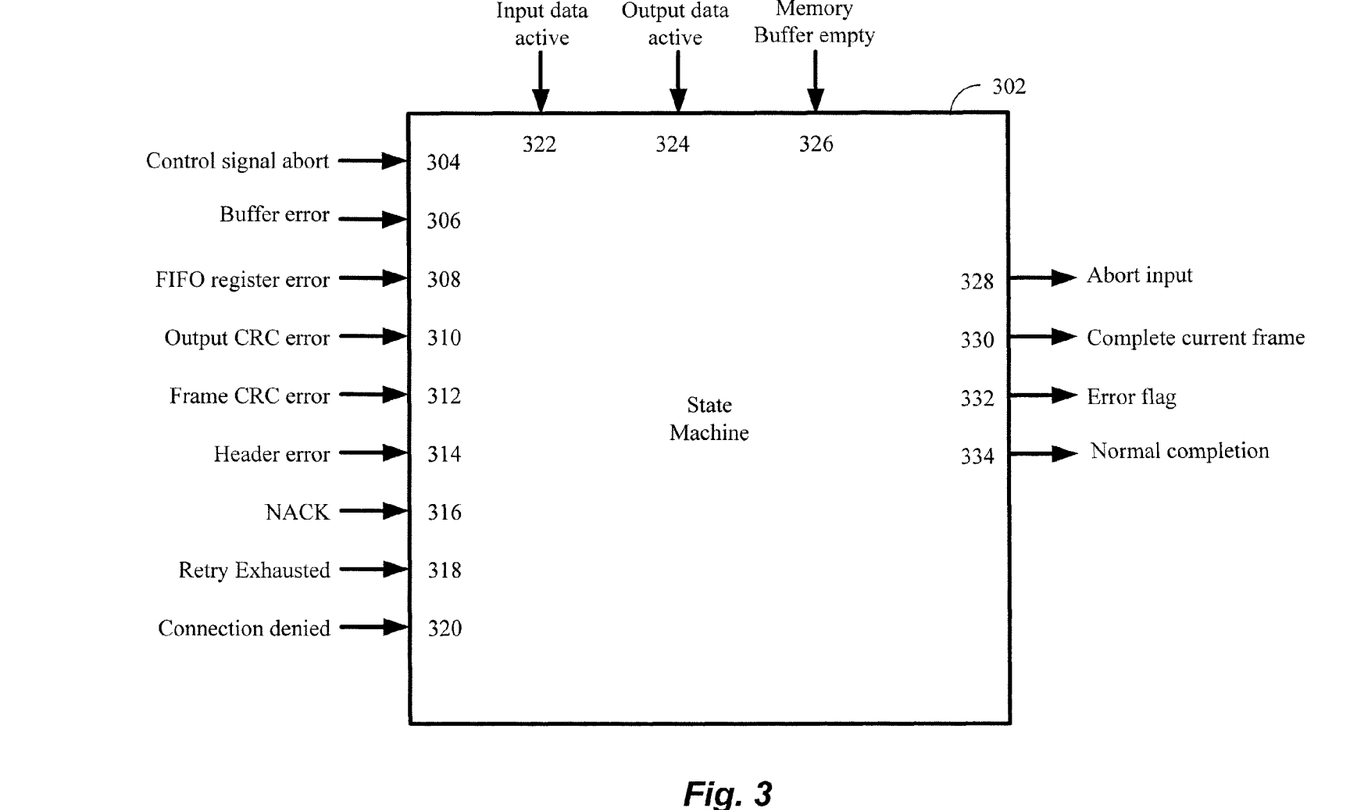
FIG. 3 is a block diagram of a state machine for use in concurrent input/output control of the FIFO memory of FIG. 2.

FIG. 3 illustrates the logical inputs and outputs from a state machine 302, similar to state machine 232 of FIG. 2. As mentioned above, the state machine abstraction is used for the purpose of this disclosure, but implementation of the state machine function in combinational logic, software, firmware, microcode, etc. will be obvious to one of ordinary skill based on the disclosure provided herein.

The state machine 302 may have exemplary error inputs such as a control signal abort 304, a buffer memory error 306, a FIFO register error 308, an output CRC error 310, a frame CRC error 312, a header error 314, a no-acknowledge (NACK) error 316, a retry exhausted error 318 (unacknowledged frames), and a connection denied error 320. This representative set of error inputs does not cover every possible error, but is sufficient to illustrate the operation of the state machine 302.

In addition to error inputs, several inputs may represent device state at any given moment. Exemplary state inputs shown are an input data active input 322, an output data active input 324, and a buffer memory empty input 326. The input data active input 322 may indicate when the buffer memory 202 is active, either receiving data via input 201 or forwarding data via connection 208. The output data active input 324 may indicate when data is present on the host connection 230, that is, when data is passing through mulitplexer 224. The buffer memory empty input 326 indicates that no more data is available in the buffer memory 202.

The outputs from the state machine 302 may include an abort input activity signal 328 and a complete current frame output signal 330. The abort input activity signal 328 may stop the loading of payload data from the buffer memory 202 to the FIFO register 214. The complete current frame signal 330 may cause the current data in the FIFO register 214, including frame CRC and header information to be sent via the host connection 230 and wait until a status is confirmed by the host 104. The confirmation may be either an ACK or a NACK. An error flag 332 may be used to signal the controller 234 that processing has stopped and, in some embodiments, may indicate the type of error and the current state of operation. A normal completion flag 334 may be used to signal the controller 234 of a normal end of processing.

As depicted, all signal lines are shown as single pins for the convenience of illustration. The signals may be expressed over a serial interface, that is, having several bytes of data rather than a single edge sensitivity. Alternatively, the signals may be carried over a bus as data packets representing messages of different types.

In general, errors may be categorized by type. The first, an explicit abort 304 from the controller 234, while not strictly an error, may be handled as an error. The second error type is buffer error 306 at the buffer memory 202, for example, a parity error. The third error type occurs at the output of the FIFO register 214 and is typified by a CRC error at the output CRC checker 216. The fourth error type occurs between the disk drive 102 and the host 104 and may be triggered by signals 316, 318, and 320.

When the first error type occurs, for example, when the control signal abort 304 goes active, the state machine 302 may examine the state of the FIFO 200 using input activity input 322 and output activity input 324. The state of the buffer memory indicated by input 326 is not a factor when handling control signal aborts. The error handling response of the state machine 302 is shown in Table 1.

TABLE 1

| Input 322 (Input activity) | Input 324 (Output activity) | Result for First Error Type (Abort) |
|---|---|---|
| Active | Inactive | Stop input queuing (set output 328), notify controller (set output 332) |
| Active | Active | Stop input queuing (set output 328), complete output frame (set output 330), then notify controller (set output 332) |
| Inactive | Active | Complete output frame (set output 330), then notify controller (set output 332) |
| Inactive | Inactive | When all data sent, ignore abort signal and send a normal completion signal (set output 334) |

When an error of the second type occurs, for example, a CRC error at the buffer memory 202, the state machine 302 may respond according to activity status as shown in Table 2.

TABLE 2

| Input 322 (Input activity) | Input 324 (Output activity) | Result for Second Error Type (Buffer memory) |
|---|---|---|
| Active | Inactive | Stop input queuing (set output 328), notify controller (set output 332) |
| Active | Active | Stop input queuing (set output 328), complete output frame (set output 330), then notify controller (set output 332) |
| Inactive | Active/ Inactive | N/A (if input is inactive, no data is left in buffer memory, so no type 2 errors will occur) |

When an error of the third type occurs, for example, a CRC error at the output of the FIFO register/transmit buffer, the state machine 302 may respond according to activity status as shown in Table 3. This type of error occurs when the FIFO register output is at a natural stopping spot, i.e. at the end of a frame of data. This type of error is usually indicative of a serious hardware failure.

TABLE 3

| Input 322 (Input activity) | Input 324 (Output activity) | Result for Third Error Type (FIFO register output CRC error) |
|---|---|---|
| Active | Inactive | Stop input queuing (set output 328), notify controller (set output 332) |
| Inactive | Inactive | Notify controller (set output 332) |

The fourth type of error, host communication errors, may take several forms. Table 4 shows the error response steps taken by the state machine 302 for the various kinds of host communication errors. When a host confirmation interval is exceeded, a so called ACK/NACK timeout, the FIFO 200 will be at a natural stopping spot on the output side. Similarly, a retry exhausted or no connection error will also occur when the output is at a natural stopping spot. In each of these cases, the only change will be in input status.

TABLE 4

| Input 322 (Input activity) | Input 324 (Output activity) | Host error | Result for Fourth Error Type (Host communication error) |
|---|---|---|---|
| Active | Active | No-acknowledge (NACK) | Stop input queuing (set output 328), complete output frame (set output 330), then notify controller (set output 332) |

TABLE 4-continued

| Input 322 (Input activity) | Input 324 (Output activity) | Host error | Result for Fourth Error Type (Host communication error) |
|---|---|---|---|
| Inactive | Active | No-acknowledge NACK | Complete output frame (set output 330), then notify controller (set output 332) |
| Active | Inactive | ACK/NAK Timeout | Stop input queuing (set output 328), notify controller (set output 332) |
| Inactive | Inactive | ACK/NAK Timeout | Notify controller (set output 332) |
| Active | Inactive | Retry Exhausted | Stop input queuing (set output 328), notify controller (set output 332) |
| Inactive | Inactive | Retry Exhausted | Notify controller (set output 332) |
| Active | Inactive | Connection denied | Stop input queuing (set output 328), notify controller (set output 332) |
| Inactive | Inactive | Connection denied | Notify controller (set output 332) |

Figure 4:
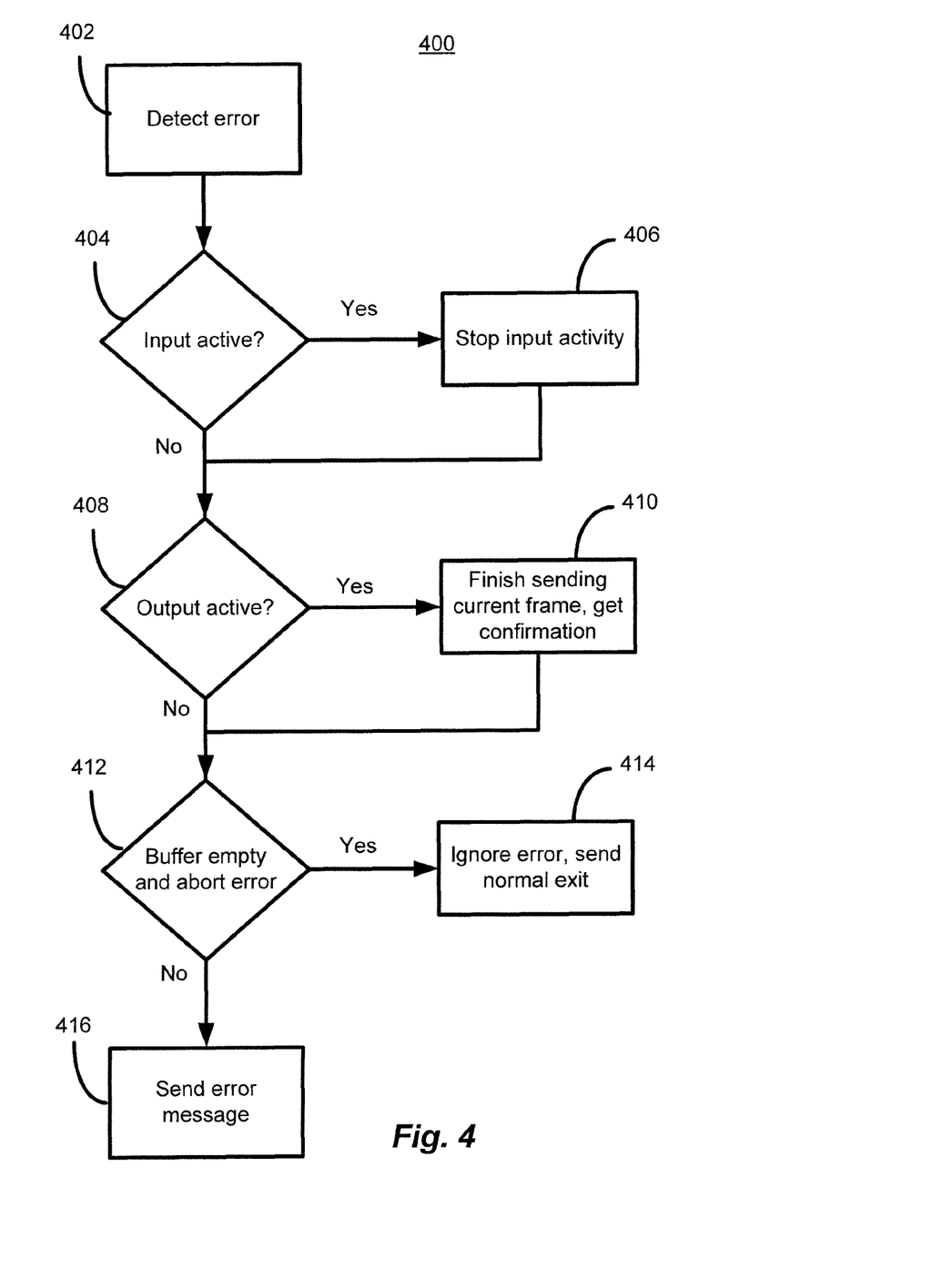
FIG. 4 is a flow chart illustrating a method of processing errors in a FIFO memory.

FIG. 4, a method 400 of processing errors in a FIFO memory, such as FIFO memory 200, is discussed and described. At block 402, an error may be detected in the FIFO 200. The error may be detected at an input buffer memory 202, a transmit buffer register 214, or between the FIFO 200 and a host 104.

At block 404, the buffer memory 202 may be checked to determine if data is being transferred from the buffer memory 202 to the transmit buffer register 214. If the input is active, the 'yes' branch from block 404 may be taken to block 406. At block 406 input activity may be stopped and processing continued at block 408.

Processing continues at block 408, when the input is not active and the 'no' branch from block 404 is followed, or after completion of activity at block 406. At block 408, the transmit buffer output 230 may be checked to see if data is being transferred to the host, such as host 104 of FIG. 1. If, at block 408, the output is active, the 'yes' branch may be followed to block 410 and the frame in progress may be sent. After a confirmation message from the host, either an ACK or a NACK, processing may continue at block 412. When the confirmation is an ACK, the current frame of data was successfully received at the host. When the confirmation is a NACK, the current frame of data was not successfully received at the host. In either case, the output has reached a natural stopping spot at the end of a frame of data and any activity at the input will have been suspended.

Block 412 may be entered via the 'no' branch from block 408 or after completion of activity at block 410. At block 412, a check may be made to determine if the error is an abort error and if the buffer memory is empty, meaning that the input is inactive and all data has been transferred to the transmit buffer register 214. If so, the 'yes' branch from block 412 may be taken to block 414. At block 414, because the final data block will have been sent at block 410 and the FIFO memory 200 will have completed sending all data, the abort error signal may be ignored and a normal exit message may be sent.

When the two conditions of block 412 are not met, the 'no' branch from block 412 may be taken to block 416, where an error message may be sent indicating the type of error and current state of the FIFO memory.

Because a FIFO memory 200 in accordance with the current disclosure will finish in a known state, a controller 234 associated with the FIFO memory 200 will be able to deal with error conditions confident of the state of data because such a FIFO memory 200 will complete or abort data activity predictably and to completion. The controller 234 can recover the error, if possible, and begin resending data from the exact point where the error occurred, without gaps or duplications, as in prior art FIFO memories.

Figure 5A:
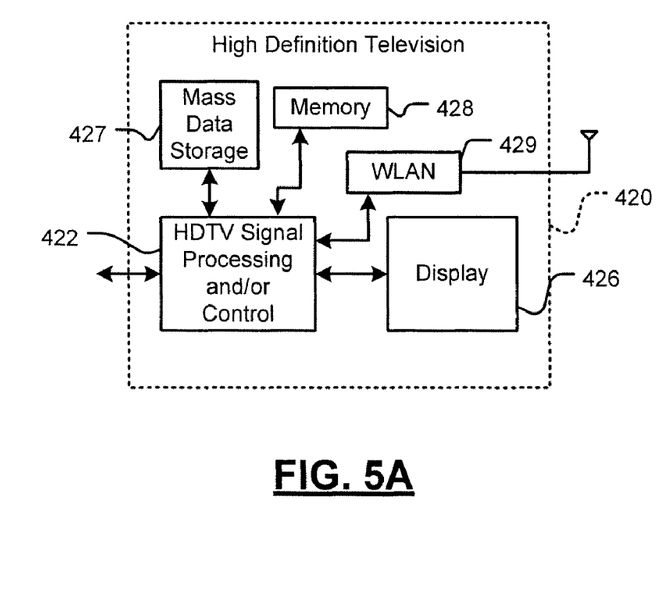
FIG. 5A is a block diagram of a high definition television that may utilize a FIFO memory such as the FIFO memory of FIG. 2.

Referring now to FIGS. 5A-5F, various exemplary implementations of the present invention are shown. Referring now to FIG. 5A, the present invention may be embodied in a high definition television (HDTV) 420. The present invention may implement mass data storage 427, supporting an HDTV signal processing and control block 422, a WLAN interface 429 and memory 428. HDTV 420 receives HDTV input signals in either a wired or wireless format and generates HDTV output signals for a display 426. In some implementations, signal processing circuit and/or control circuit 422 and/or other circuits (not shown) of HDTV 420 may process data, perform coding and/or encryption, perform calculations, format data and/or perform any other type of HDTV processing that may be required.

HDTV 420 may communicate with mass data storage 427 that stores data in a nonvolatile manner such as optical and/or magnetic storage devices. At least one mass storage device may have the configuration shown in FIG. 1. The mass storage device may be a mini HDD that includes one or more platters having a diameter that is smaller than approximately 1.8". HDTV 420 may be connected to memory 428 such as RAM, ROM, low latency nonvolatile memory such as flash memory and/or other suitable electronic data storage. HDTV 420 also may support connections with a WLAN via a WLAN network interface 429.

Figure 5B:
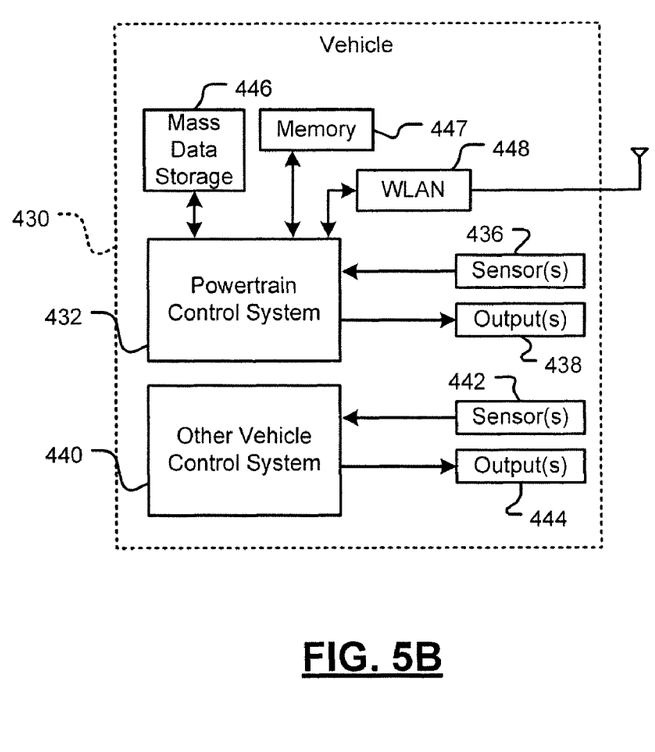
FIG. 5B is a block diagram of a vehicle that may utilize a FIFO memory such as the FIFO memory of FIG. 2.

Referring now to FIG. 5B, a control system of a vehicle 430 may include mass data storage 446, as well as a WLAN interface 448. In some implementations, the present invention implements a powertrain control system 432 that receives inputs from one or more sensors 436 such as temperature sensors, pressure sensors, rotational sensors, airflow sensors and/or any other suitable sensors and/or that generates one or more output control signals 438 such as engine operating parameters, transmission operating parameters, and/or other control signals.

The present invention may also be embodied in other control systems 440 of vehicle 430. Control system 440 may likewise receive signals from input sensors 442 and/or output control signals to one or more output devices 444. In some implementations, control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 432 may communicate with mass data storage 427 that stores data in a nonvolatile manner such as optical and/or magnetic storage devices. At least one mass storage device may have the configuration shown in FIG. 1. The mass storage device 446 may be a mini HDD that includes one or more platters having a diameter that is smaller than approximately 1.8". Powertrain control system 432 may be connected to memory 447 such as RAM, ROM, low latency nonvolatile memory such as flash memory and/or other suitable electronic data storage. Powertrain control system 432 also may support connections with a WLAN via a WLAN network interface 448. The control system 440 may also include mass data storage, memory and/or a WLAN interface (all not shown).

Figure 5C:
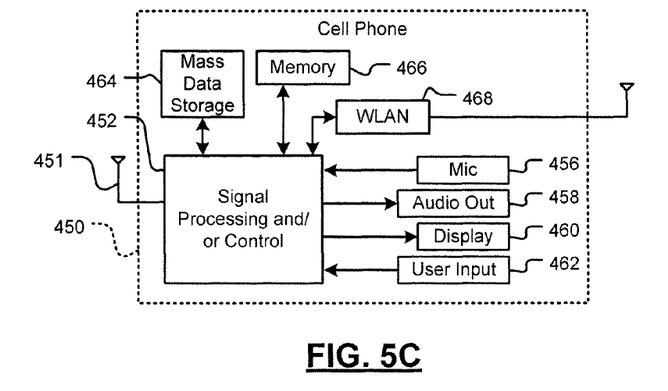
FIG. 5C is a block diagram of a cellular phone that may utilize a FIFO memory such as the FIFO memory of FIG. 2.

Referring now to FIG. 5C, the present invention may be embodied in a cellular phone 450 that may include a cellular antenna 451. The cellular phone 450 may include either or both signal processing and/or control circuits, which are generally identified in FIG. 5C at 452, a WLAN interface and/or mass data storage 464 of the cellular phone 450. In some implementations, cellular phone 450 includes a microphone 456, an audio output 458 such as a speaker and/or audio output jack, a display 460 and/or an input device 462 such as a keypad, pointing device, voice actuation and/or other input device. Signal processing and/or control circuits 452 and/or other circuits (not shown) in cellular phone 450 may process data, perform coding and/or encryption, perform calculations, format data and/or perform other cellular phone functions.

Cellular phone 450 may communicate with mass data storage 464 that stores data in a nonvolatile manner such as optical and/or magnetic storage devices for example hard disk drives HDD and/or DVDs. At least one HDD and/or DVD may have the configuration shown in FIG. 1. The HDD may be a mini HDD that includes one or more platters having a diameter that is smaller than approximately 1.8". Cellular phone 450 may be connected to memory 466 such as RAM, ROM, low latency nonvolatile memory such as flash memory and/or other suitable electronic data storage. Cellular phone 450 also may support connections with a WLAN via a WLAN network interface 468.

Figure 5D:
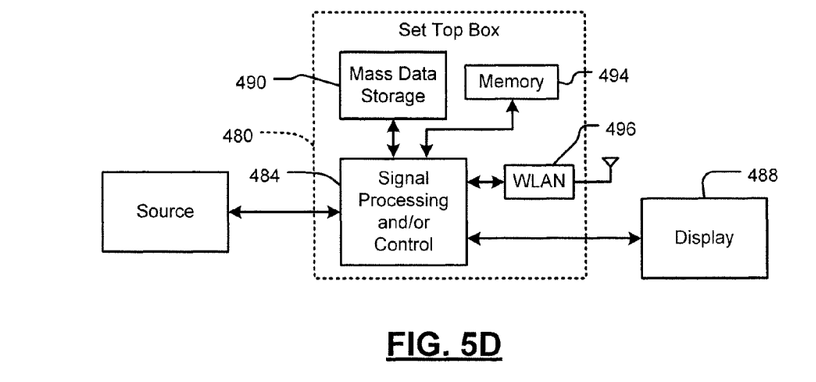
FIG. 5D is a block diagram of a set top box that may utilize a FIFO memory such as the FIFO memory of FIG. 2.

Referring now to FIG. 5D, the present invention may be embodied in a set top box 480. The set top box 480 may include either or both signal processing and/or control circuits, which are generally identified in FIG. 5D at 484, a WLAN interface and/or mass data storage 490 of the set top box 480. Set top box 480 receives signals from a source such as a broadband source and outputs standard and/or high definition audio/video signals suitable for a display 488 such as a television and/or monitor and/or other video and/or audio output devices. Signal processing and/or control circuits 484 and/or other circuits (not shown) of the set top box 480 may process data, perform coding and/or encryption, perform calculations, format data and/or perform any other set top box function.

Set top box 480 may communicate with mass data storage 490 that stores data in a nonvolatile manner. Mass data storage 490 may include optical and/or magnetic storage devices for example hard disk drives HDD and/or DVDs. At least one HDD and/or DVD may have the configuration shown in FIG. 1. The HDD may be a mini HDD that includes one or more platters having a diameter that is smaller than approximately 1.8". Set top box 480 may be connected to memory 494 such as RAM, ROM, low latency nonvolatile memory such as flash memory and/or other suitable electronic data storage. Set top box 480 also may support connections with a WLAN via a WLAN network interface 496.

Figure 5E:
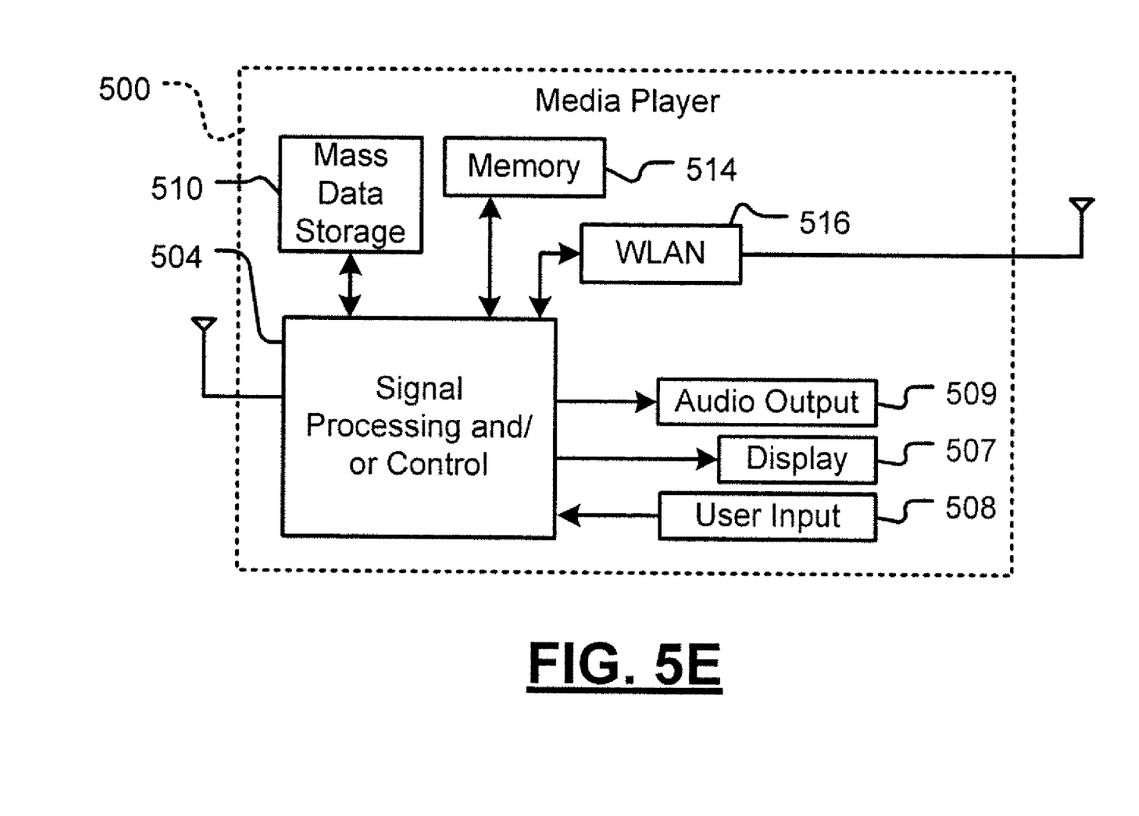
FIG. 5E is a block diagram of a media player that may utilize a FIFO memory such as the FIFO memory of FIG. 2.

Referring now to FIG. 5E, the present invention may be embodied in a media player 500. The media player 500 may include either or both signal processing and/or control circuits, which are generally identified in FIG. 5E at 504, a WLAN interface and/or mass data storage 510 of the media player 500. In some implementations, media player 500 includes a display 507 and/or a user input 508 such as a keypad, touchpad and the like. In some implementations, media player 500 may employ a graphical user interface (GUI) that typically employs menus, drop down menus, icons and/or a point-and-click interface via display 507 and/or user input 508. Media player 500 further includes an audio output 509 such as a speaker and/or audio output jack. Signal processing and/or control circuits 504 and/or other circuits (not shown) of media player 500 may process data, perform coding and/or encryption, perform calculations, format data and/or perform any other media player function.

Media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD and/or DVD may have the configuration shown in FIG. 1. The HDD may be a mini HDD that includes one or more platters having a diameter that is smaller than approximately 1.8". Media player 500 may be connected to memory 514 such as RAM, ROM, low latency nonvolatile memory such as flash memory and/or other suitable electronic data storage. Media player 500 also may support connections with a WLAN via a WLAN network interface 516. Still other implementations in addition to those described above are contemplated.

Figure 5F:
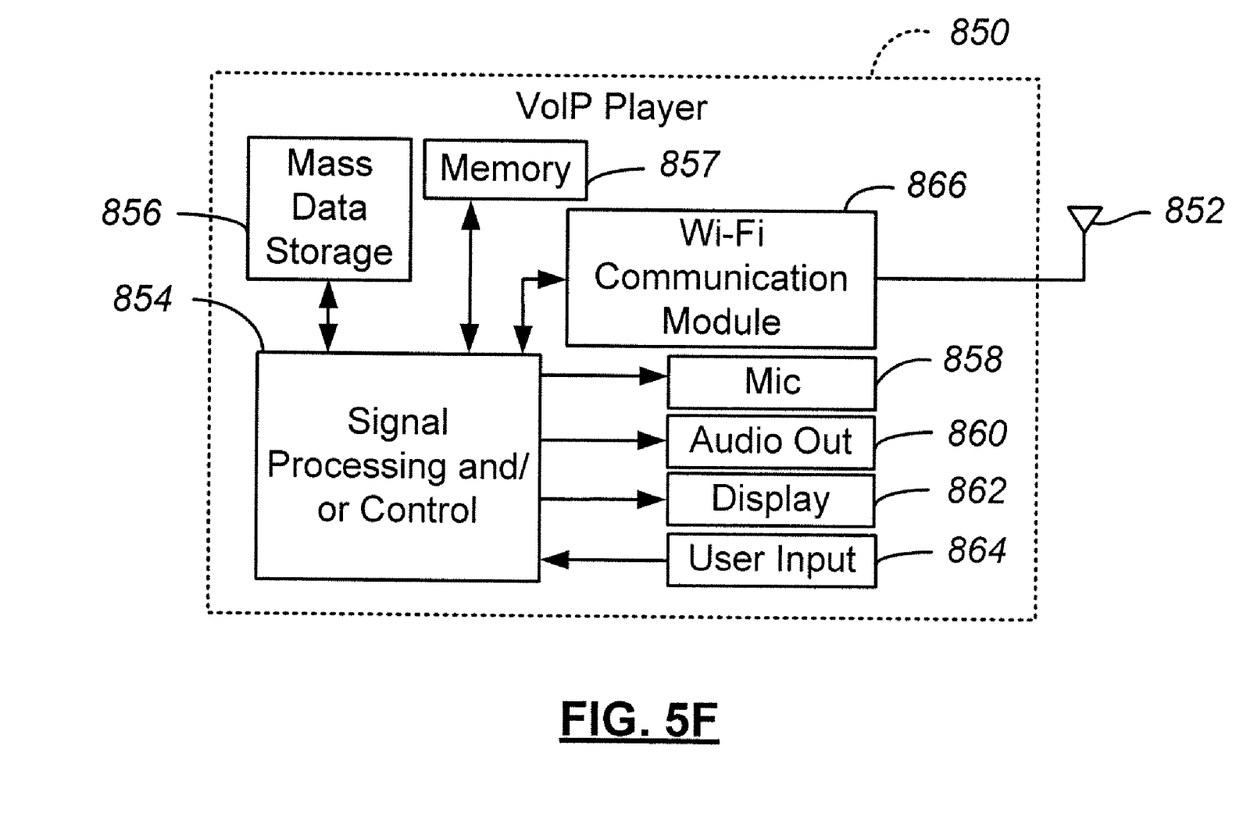
FIG. 5F is a block diagram of a voice over IP device that may utilize a FIFO memory such as the FIFO memory of FIG. 2.

Referring to FIG. 5F, the present invention may be embodied in a Voice over Internet Protocol (VoIP) phone 550 that may include an antenna 518. The VoIP phone 550 may include either or both signal processing and/or control circuits, which are generally identified in FIG. 5F at 504, a wireless interface and/or mass data storage of the VoIP phone 550. In some implementations, VoIP phone 550 includes, in part, a microphone 510, an audio output 512 such as a speaker and/or audio output jack, a display monitor 514, an input device 516 such as a keypad, pointing device, voice actuation and/or other input devices, and a Wireless Fidelity (Wi-Fi) communication module 508. Signal processing and/or control circuits 504 and/or other circuits (not shown) in VoIP phone 550 may process data, perform coding and/or encryption, perform calculations, format data and/or perform other VoIP phone functions.

VoIP phone 550 may communicate with mass data storage 502 that stores data in a nonvolatile manner such as optical and/or magnetic storage devices, for example hard disk drives HDD and/or DVDs. At least one HDD and/or DVD may have the configuration shown in FIG. 1. The HDD may be a mini HDD that includes one or more platters having a diameter that is smaller than approximately 1.8". VoIP phone 550 may be connected to memory 506, which may be a RAM, ROM, low latency nonvolatile memory such as flash memory and/or other suitable electronic data storage. VoIP phone 550 is configured to establish communications link with a VoIP network (not shown) via Wi-Fi communication module 508.

We claim:

1. A first-in first-out (FIFO) memory supporting input and output condition monitoring and a coordinated error response, the FIFO memory comprising:
   a buffer memory storing payload data, the payload data comprising a frame of data to be sent to a host;
   a FIFO register with an input and an output, the input and the output supporting separate input and output data rates, the input of the FIFO register being coupled to the buffer memory;
   a host connection coupled to the output of the FIFO register, the host connection sending the frame of data to the host; and
   a header generator coupled to the host connection, the header generator creating a header that is added to the payload data;
   a state machine coupled to the buffer memory, the FIFO register, the header generator, and the host connection, the state machine having logic supporting different error responses corresponding to error type, a state of the buffer memory, and a state of the host connection, wherein the error type includes states corresponding to i) a first error type caused by an abort from a controller, ii) a second error type at the buffer memory, iii) a third error type at the FIFO register output, and iv) a fourth error type occurring between the FIFO and a host.

2. The FIFO memory of claim 1, wherein the state machine generates an error response to the first error type, when the state of the buffer memory is active and the state of the host connection is inactive, to stop input queuing and send an error signal.

3. The FIFO memory of claim 1, wherein the state machine generates an error response to the first error type, when the state of the buffer memory is active and when the state of the host connection is active, to:
    stop input queuing,
    complete sending a current frame of data, and
    send an error signal after receiving a confirmation from the host for the current frame of data.

4. The FIFO memory of claim 1, wherein the state machine generates an error response to the first error type, when the state of the buffer memory is inactive and when the state of the host connection is active, to:
    complete sending a current frame of data, and
    send an error signal after receiving a confirmation from the host for the current frame of data.

5. The FIFO memory of claim 1, wherein the state machine generates an error response to the first error type, when the state of the buffer memory is inactive and the state of the host connection is inactive, to:
    ignore the first error type, and
    send a normal exit signal.

6. The FIFO memory of claim 1, wherein the state machine generates an error response to the second error type, when the state of the buffer memory is active and when the state of the host connection is inactive, to:
    stop input queuing, and
    send an error signal.

7. The FIFO memory of claim 1, wherein the state machine generates an error response to the second error type, when the state of the buffer memory is active and when the state of the host connection is active, to:
    stop input queuing,
    complete sending a current frame of data, and
    send an error signal after receiving a confirmation from the host for the current frame of data.

8. The FIFO memory of claim 1, further comprising a cyclic redundancy check (CRC) block coupled between the output and the host connection, the CRC block to detect the third error type when the state of the buffer memory is active, wherein the state machine generates an error response to the third error type to stop input queueing and send an error signal.

9. The FIFO memory of claim 1, further comprising a cyclic redundancy check (CRC) block coupled between the output and the host connection, the CRC block to detect the third error type when the state of the buffer memory is inactive, wherein the state machine generates an error response to the third error type to send an error signal.

10. The FIFO memory of claim 1, wherein the state machine generates an error response to the fourth error type, when a no-acknowledge is received from the host and the state of the buffer memory is active and the state of the host connection is active, to:
    stop input queueing,
    finish sending a current frame of data, and
    send an error signal.

11. The FIFO memory of claim 1, wherein the state machine generates an error response to the fourth error type, when the state of the buffer memory is inactive and the state of the host connection is active when a no-acknowledge is received, to:
    finish sending a current frame of data, and
    send an error signal.

12. The FIFO memory of claim 1, wherein the state machine generates an error response to the fourth error type to stop input queueing and send an error signal when a limit is reached for a number of unacknowledged frames of data transmissions.

13. The FIFO memory of claim 1, wherein the state machine generates an error response to the fourth error type to stop input queueing and send an error signal when a connection cannot be established with the host.

14. A method of managing error conditions in a first in first out (FIFO) memory transmitting a set of data, the FIFO memory having an input buffer memory, a communication port coupled to an external host, a controller, and a transmit buffer with an input and an output, the method comprising:
    determining when an error occurs;
    determining a source of the error;
    observing activity of the input buffer memory;
    observing activity of the communication port;
    determining an error response that varies according to i) the observed activity of the input buffer memory, ii) the observed activity of the communication port, and iii) the source of the error; and
    executing the error response.

15. The method of claim 14, wherein executing the error response when the error is an abort signal, the input buffer memory is active, and the communication port is inactive comprises:
    halting transfer of data from the input buffer memory to the transmit buffer; and
    notifying the controller that an error occurred.

16. The method of claim 14, wherein executing the error response when the error is an abort signal, the input buffer memory is active, and the communication port is active comprises:
    halting transfer of data from the input buffer memory to the transmit buffer;
    completing transmission of a current frame of data; and
    notifying the controller that an error occurred.

17. The method of claim 14, wherein executing the error response when the error is an abort signal, the input buffer memory is inactive, and the communication port is active comprises:
    completing transmission of a current frame of data; and
    notifying the controller that an error occurred.

18. The method of claim 14, wherein executing the error response when the error is an abort signal, the input buffer memory is inactive, and the communication port is inactive comprises:
    ignoring the abort signal; and
    sending a normal exit message to the controller.

19. The method of claim 14, wherein executing the error response when the error is an input buffer memory error, the input buffer memory is active, and the communication port is inactive comprises:
    halting transfer of data from the input buffer memory to the transmit buffer; and
    notifying the controller that an error occurred.

20. The method of claim 14, wherein executing the error response when the error is a buffer memory error, the input buffer memory is active, and the communication port is active comprises:
- halting transfer of data from the input buffer memory to the transmit buffer;
- completing sending the current data frame; and
- notifying the controller that an error occurred after a confirmation is received from the host on the current frame.

21. The method of claim 14, wherein executing the error response when the error is a transmit buffer error, the input buffer memory is active, and the communication port is inactive comprises:
- halting transfer of data from the input buffer memory to the transmit buffer; and
- notifying the controller that an error occurred.

22. The method of claim 14, wherein executing the error response when the error is a transmit buffer error, the input buffer memory is inactive, and the communication port is inactive comprises:
- notifying the controller that an error occurred.

23. The method of claim 14, wherein executing the error response when the error is a no acknowledge signal from the host, the input buffer memory is active, and the communication port is active comprises:
- halting transfer of data from the input buffer memory to the transmit buffer;
- completing sending of a current frame of data; and
- notifying the controller that an error occurred.

24. The method of claim 14, wherein executing the error response when the error is a no acknowledge signal from the host, the input buffer memory is inactive, and the communication port is active comprises:
- completing sending a current frame of data; and
- notifying the controller that an error occurred.

25. The method of claim 14, wherein executing the error response when the error is a limit of accumulated frames sent without a confirmation from the host, and the input buffer memory is active and the communication port is inactive comprises:
- halting transfer of data from the input buffer memory to the transmit buffer; and
- notifying the controller that an error occurred.

26. The method of claim 14, wherein executing the error response when the error is a limit of accumulated frames sent without a confirmation from the host, the input buffer memory is inactive and the communication port is inactive comprises:
- notifying the controller that an error occurred.

27. The method of claim 14, wherein executing the error response when the error is an unable to connect to host error, the input buffer memory is active and the communication port is inactive comprises:
- halting transfer of data from the input buffer memory to the transmit buffer: and
- notifying the controller that an error occurred.

28. The method of claim 14, wherein executing the error response when the error is an unable to connect to host error, the input buffer memory is inactive and the communication port is inactive comprises:
- notifying the controller that an error occurred.

29. A disk controller for use in managing data flow with a mass storage device, the disk controller comprising:
- a first port coupled to the mass storage device;
- a buffer memory configured to store data received via the first port;
- a first integrity checker coupled to the buffer memory;
- a transmit buffer with an input coupled to the first integrity checker and an output;
- a second integrity checker coupled to the output of the transmit buffer;
- a second port coupled to the second integrity checker, the second port configured to transmit data to a host; and
- a control unit that responds differently in response to an error detected by the first integrity checker, an error detected by the second integrity checker, and an abort request based on observed activity of the buffer memory and observed activity of the second port, wherein the control unit is configured to manage a response to the abort request including:
  - halting transfer of data from the buffer memory to the transmit buffer when the buffer memory is active;
  - completing sending a current data frame via the second port when the output second port is active and sending an error message when the sending the current data frame completes.

30. The disk controller of claim 29 wherein the control unit manages a response to the error detected by the first integrity checker including:
- halting transfer of data from the input buffer memory to the transmit buffer when the buffer memory is active; and
- completing sending a current data frame via the second port when the output second port is active and sending an error message when the sending the current data frame completes.

31. The disk controller of claim 29 wherein the control unit manages a response to the error detected by the second integrity checker comprising:
- halting transfer of data from the input buffer memory to the transmit buffer when the buffer memory is active; and
- completing sending a current data frame via the second port when the output second port is active, and sending an error message when the sending the current data frame completes.

32. The disk controller of claim 29 wherein the control unit manages a response to a host acknowledgement error comprising:
- halting transfer of data from the input buffer memory to the transmit buffer when the buffer memory is active; and
- completing sending a current data frame via the second port when the output second port is active and sending an error message when the sending the current data frame completes.

33. The disk controller of claim 29 wherein the control unit manages a response to a no connect with the host error comprising:
- halting transfer of data from the input buffer memory to the transmit buffer when the buffer memory is active.

* * * * *